May 1, 1928.

J. B. FISHER 1,667,728

OIL PUMP

Filed Oct. 8, 1926

Inventor,
James B. Fisher
By Brown, Boettcher & Dinner
Atty

Patented May 1, 1928.

1,667,728

UNITED STATES PATENT OFFICE.

JAMES B. FISHER OF WAUKESHA, WISCONSIN, ASSIGNOR TO WAUKESHA MOTOR COMPANY, OF WAUKESHA, WISCONSIN, A CORPORATION OF WISCONSIN.

OIL PUMP.

Application filed October 8, 1926. Serial No. 140,227.

My invention relates to oil pumps particularly useful in internal combustion engines for automotive vehicles for preventing collection of the oil in the forward end of the crank case when the vehicle is traveling over uneven ground and to keep it in the oil sump available for lubricating purposes. The object of the invention is to provide such an arrangement in which the pump inlet is normally above the oil level in the crank case, and in which the pump is lubricated when normally running idle by lubricating oil fed to the end crank shaft bearing from which the pump is suspended.

On the accompanying drawings.

Figure 1:
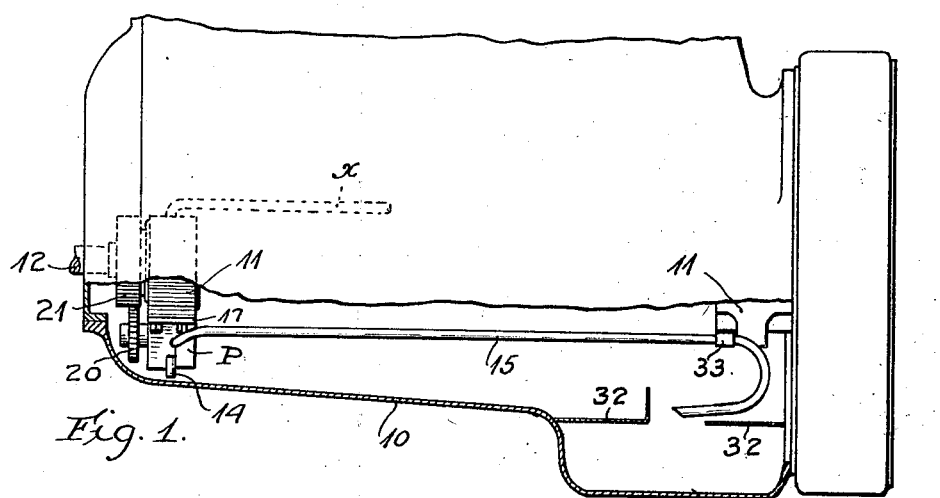
Figure 1 shows the lower part of an engine crank case with the oil pump and piston.

Referring to Fig. 1, the crank case 10 has the bearing structures 11 which journal the crank shaft 12. At its rear end, the crank case has the oil sump 13, from which oil is drawn by means of a pump, (not shown) and distributed to the crank shaft and other bearings through a duct $x$. In addition to the main oil pump, I provide the auxiliary oil pump P and I support this pump from the front crank shaft bearing. This auxiliary pump has the inlet 14 which, when the engine is at normal level, is above the level of the oil in the crank case, but which, when the engine is tilted forwardly, will be in the oil so that the pump will pump oil and return it thru a pipe 15 to the sump 13.

Figure 3:
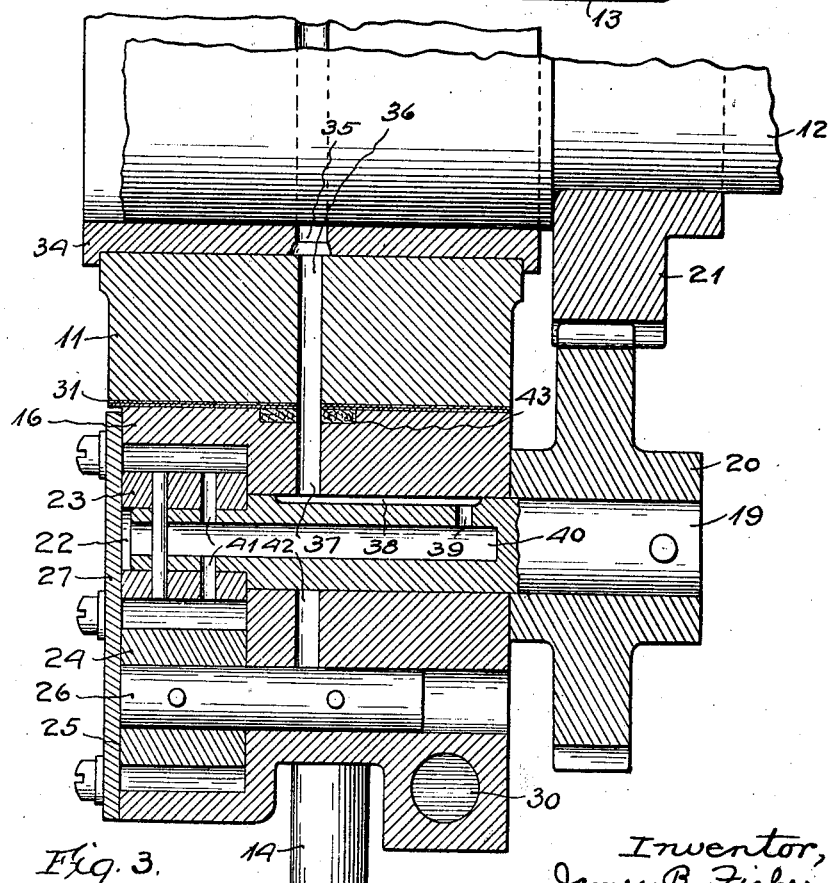
Fig. 3 is a sectional view on line 3—3 of Fig. 2.
Figure 2:
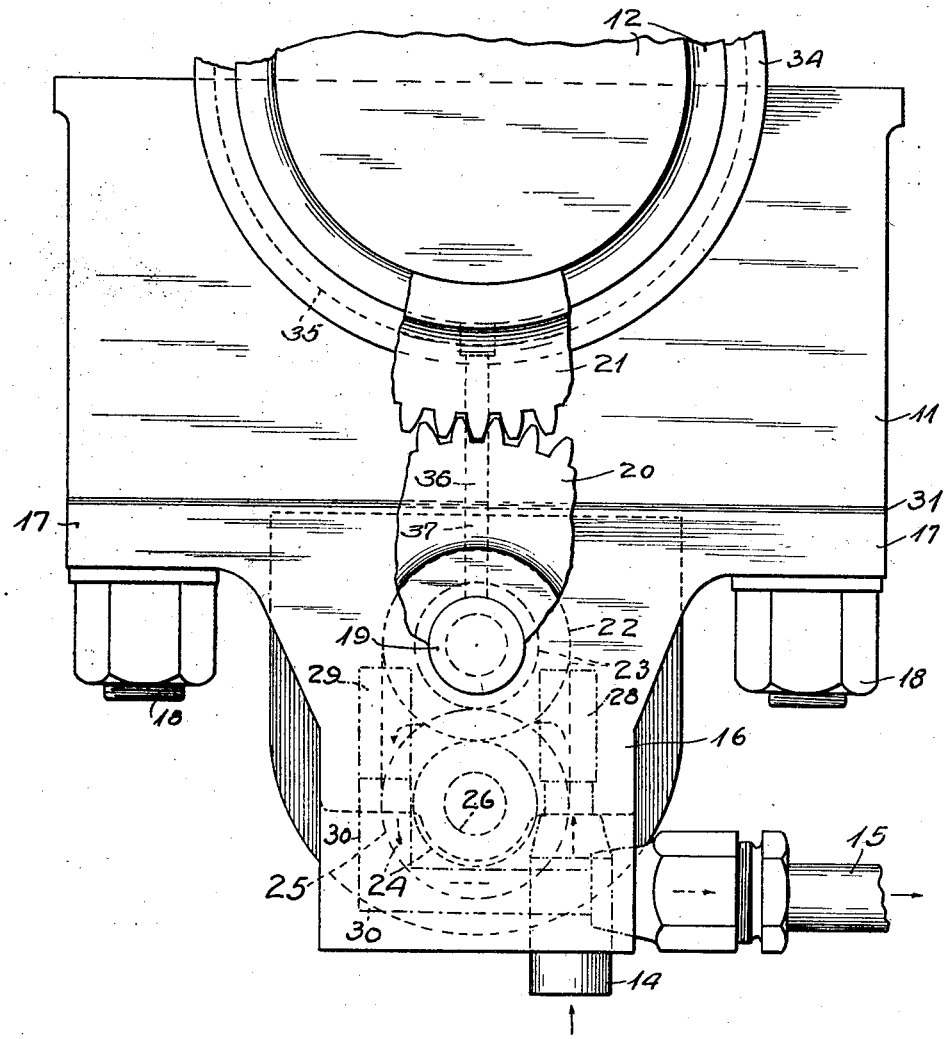
Fig. 2 is an end view of the crank shaft bearing and the pump supported thereon.

Referring to Figs. 2 and 3, the body 16 of the pump has the flanges 17 by means of which it is secured against the under side of the front crank shaft bearing 11 by bolts 18. Journaled in this body is the shaft 19 which is below the engine crank shaft and parallel therewith and at its outer end carries the gear 20 which meshes with the driving gear 21 on the outer end of the crank shaft. At its inner end, the shaft 19 extends into the pump gear chamber 22 and supports the pump gear 23 in this chamber. This pump gear meshes with the companion pump gear 24 in the chamber 25, which companion gear is journaled on the stub-shaft 26 secured in the pump body. The outer ends of the pump gear chambers are closed by the cover plate 27.

The pump gears receive the oil from the inlet chamber 28 with which the oil inlet duct 14 communicates. The gears pump the oil into the chamber 29, from which it is discharged through the duct 30 into the return pipe 15, the flow being indicated by the arrows on Fig. 2. To properly align the pump relative to the crank shaft and to get the proper mesh between the gears 20 and 21, adjustment shims 31 are inserted between the pump base and the supporting bearing 11.

As before stated, the inlet duct 14 for the pump is above the oil level when the vehicle on which the engine is installed is running along the ordinary grades. However, as soon as the engine is inclined forwardly sufficiently to cause the oil to flow from the sump 13 toward the front of the crank case, the inlet duct 14 will be in the oil and the pump will then return this oil through the pipe 15 to the sump so that there will always be an available supply of oil for lubricating purposes. A baffle wall 32 at the sump will guide the returned oil to the sump and will also retard the spilling over of the sump when the engine is inclined forwardly. A suitable clamp 33 will support the return pipe 15 at its inner end in position over the sump.

The pump P is running while the engine is running, and when it is pumping oil the pump gears will distribute part of this oil to the various bearing surfaces and keep the pump well lubricated. However, when the pump is running idle, this source of lubrication will cease. To insure proper lubrication at all times, I provide oil ducts to the various bearing surfaces and connect them to receive part of the lubricating oil supplied to the crank shaft bearings by the main lubricating oil pump. In the bushing 34 of the front crank shaft bearing, I provide the oil collecting groove 35 which receives oil from the duct $x$ (Fig. 1) and which communicates with the oil duct 36 extending downwardly through the bearings and registering with the duct 37 extending through the pump body to discharge into the oil groove 38 in the pump shaft 19. This groove feeds the oil through the hole 39 to the axle passageway 40 in the pump shaft leading to the pump gear chamber 22 and communicating also thru radial holes 41 with the meshing surfaces of the gear 23. The oil then finds its way to the meshing surfaces of the companion gear 24 and to the stub shaft 26. A duct 42 extends directly from the main shaft bore to the bore of the stub shaft. The various bearing surfaces of the pump are thus well lubricated whether the pump is working or running idle. A felt washer 43 surrounds the duct 36 at the juncture of the pump body and the crank shaft bearing to prevent leakage of oil.

The auxiliary pump is compact and securely supported under the front crank shaft bearing, and when the lower removable part or pan of the crank case is removed, the pump parts are readily accessible upon removal of the cover plate 27. The pump is always running while the engine is running and as soon as oil flows to the front of the crank case to a sufficient depth, the pump will immediately pick up the oil and return it to the oil sump so that the sump is always kept sufficiently filled to properly feed the bearing lubricating the main pump.

I claim as follows:—

1. The combination of an internal combustion engine having a crank case and an oil sump at the rear end thereof, a pump at the front end of said crank case in driving connection with the engine crank shaft, an oil inlet for said pump above the oil level in the crank case when the engine is running along ordinary grades and communicating with oil flowing to the forward end of the crank case when the engine is tilted abnormally, and a return pipe from said pump to said sump.

2. The combination of an internal combustion engine having a crank shaft and an oil sump for lubricating oil at the rear end of said crank case, an oil pump at the forward end of said crank case continuously driven by the engine, an inlet for said pump above the level of the oil in said crank case during ordinary tilting of said engine but adapted to communicate with oil flowing to the forward part of the crank case during extraordinary forward tilting of the engine, and an oil return path from said pump to said sump.

3. In an internal combustion engine, the combination with the engine crank shaft and a bearing therefor, of a pump supported on said bearing and continuously driven from said shaft, and oil ducts leading from said crank shaft bearing to the pump bearings for conveying surplus lubricating oil from the crank shaft bearing to the pump bearings.

4. In an internal combustion engine, a pump at the front end of the engine crank case supported from the front crank shaft bearing and being connected to be continuously driven from said shaft, an oil inlet for the pump normally out of communication with oil in said crank case but in communication therewith when oil spills from the rear end to the front end of the crank case during tilting of the engine, a return pipe from the pump to the rear end of the crank case, and oil ducts in said crank shaft bearing and pump for conducting surplus lubricating oil from said crank shaft bearing to the pump bearings.

5. In an internal combustion engine, the combination of an oil pump supported on the front crank shaft bearing and continuously driven by the crank shaft when the engine is operating, an inlet for the pump receiving oil only when oil flows to the front of the crank case during tilting of the engine, the pump parts being lubricated by the pumped oil during working of the pump, and means for conducting surplus lubricating oil from said crank shaft bearing to the pump parts to lubricate the pump parts when the pump is not working.

In witness whereof, I hereunto subscribe my name this 29 day of September, 1926.

JAMES B. FISHER.